Figure 1:
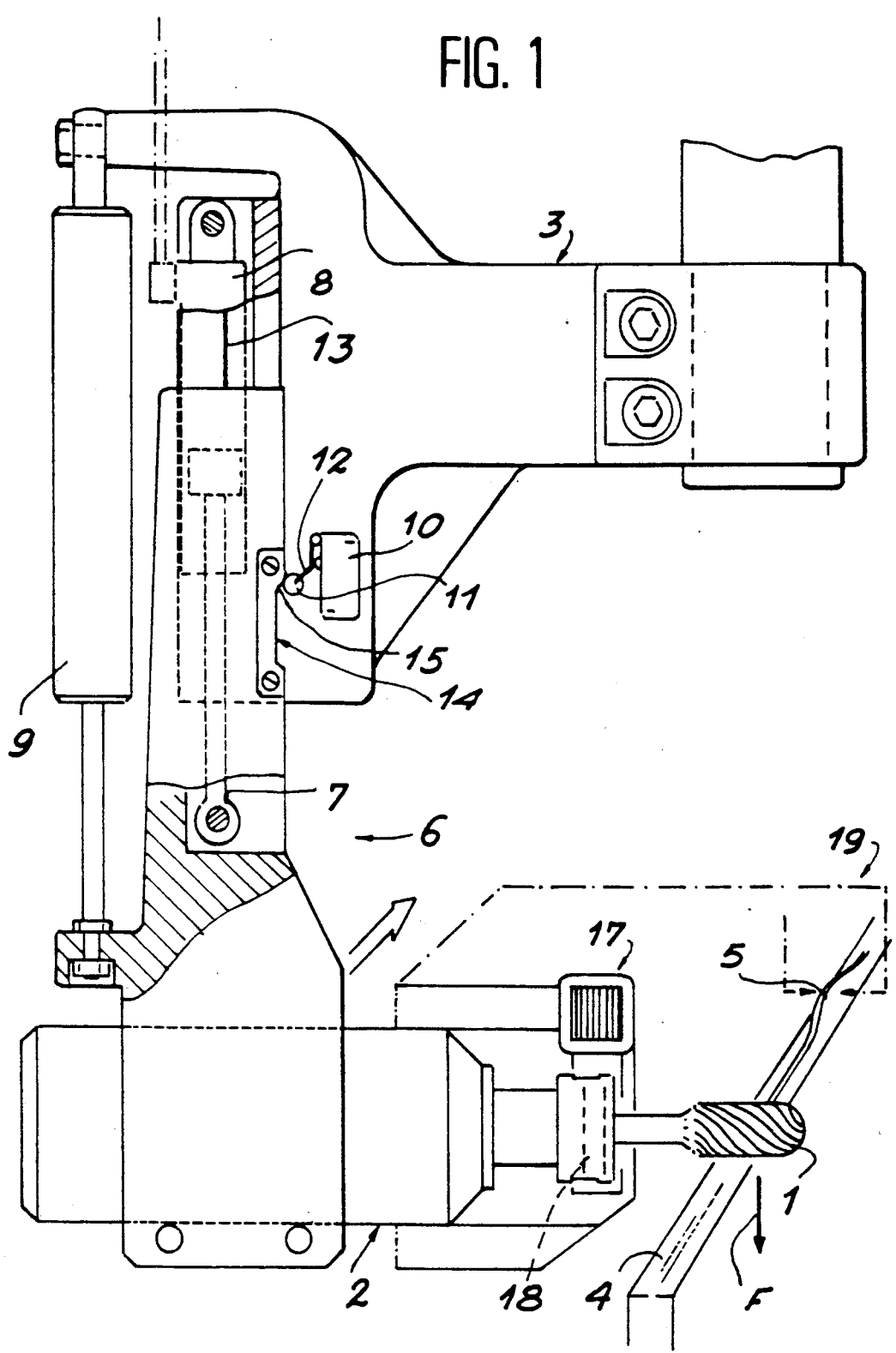

United States Patent [19]

Sgarbi et al.

[11] Patent Number: 5,174,700
[45] Date of Patent: Dec. 29, 1992

[54] DEVICE FOR CONTOURING BLOCKING BURRS FOR A DEBURRING TOOL

[75] Inventors: Frédéric Sgarbi, Paris; Michel Ferard, Sartrouville, both of France

[73] Assignee: Commissariat A l'Energie Atomique, Paris, France

[21] Appl. No.: 551,140

[22] Filed: Jul. 11, 1990

[30] Foreign Application Priority Data

Jul. 12, 1989 [FR] France .................... 89 09430

[51] Int. Cl.$^5$ ............................................. B23C 3/12
[52] U.S. Cl. ............................... 409/140; 29/33 A; 409/195; 901/41
[58] Field of Search .............. 29/33 A; 409/140, 8, 409/139, 194, 195; 901/41

[56] References Cited

U.S. PATENT DOCUMENTS 4,203,183   5/1980   Pavlovsky ...................... 29/33 A

FOREIGN PATENT DOCUMENTS

| | | |
|---|---|---|
| 3515111 | 11/1986 | Fed. Rep. of Germany ...... 409/140 |
| 2253601 | 7/1975 | France . |
| 59-214508 | 12/1984 | Japan . |
| 59-214509 | 12/1984 | Japan . |
| 61-0114811 | 1/1986 | Japan . |
| 63-007209 | 1/1988 | Japan . |
| 63-180408 | 7/1988 | Japan . |
| 764873 | 9/1980 | U.S.S.R. . |
| 1005576 | 9/1965 | United Kingdom . |

*Primary Examiner*—Z. R. Bilinsky
*Attorney, Agent, or Firm*—Michael N. Meller

[57] ABSTRACT

The present invention is a device for contouring blocking burrs for a milling cutter. The penumatic broach or spindle is equipped with a tachometer, which controls the reversal of the supply of a pneumatic jack connecting the spindle to the wrist or handle of the robot as soon as the rotation speed of the cutter drops below a threshold value. The blocking burrs are then cut off by means of successive passes.

4 Claims, 2 Drawing Sheets

DEVICE FOR CONTOURING BLOCKING BURRS FOR A DEBURRING TOOL

DESCRIPTION

The invention relates to a device for contouring blocking burrs for a deburring tool.

The burrs which are e.g. produced on castings at the location of the joining plane have an unforeseeable size and which can vary considerably along the contour to be deburred. In the case of robotized machining operations no means exist for forecasting the arrival of the tool at the large parts referred to as "blocking burrs", which are liable to stop the tool and damage it. Systems are known where an unacceptable machining condition is detected, particularly by a rise in the vibration level, so that the tool can then be removed and machining stopped.

The system conventionally present on the wrists of robots carrying a deburring tool, which consists of an elastic member enabling the tool to move towards or away from the contour as a function of the cutting forces or stresses, is not adequate because it is impossible to guarantee that the tool will be adequately disengaged.

The device according to the invention ensures the contouring of the burrs, no matter what their size and independently of the characteristics of the robot and the cutting tool. It consists of applying to the tool a cutting force or stress which is normally constant over the contour and carrying out an instantaneous disengagement of the tool as soon as the quantity of material to be removed become excessive, which can be indicated with the aid of cutting parameters and in particular the tool cutting speed. In the case of a pneumatic motor, said speed will be directly measured by a tachometer and the retraction of the tool will be controlled as soon as a threshold speed is reached. In the case of an electric motor, an equivalent information can be obtained by measuring the current consumed, which can be easily linked with the tool rotation speed.

More specifically, the invention relates to a device for contouring blocking burrs for a rotary deburring tool dependent on a support, comprising a means for pressing the tool onto the contour to be deburred and retracting the tool above the contour to be deburred located between the tool and the support, a sensor measuring a quantity representative of the tool rotation speed, as well as a control circuit controlling the pressing and retraction means as a function of the values assumed by said quantity.

The pressing and retracting means is constituted by a pneumatic jack having a chamber, whose volume increases correspond to displacements of the tool towards the contour to be deburred and linked by the control circuit either with a constant pressurized gas source, or with a deflating orifice.

Figure 2:
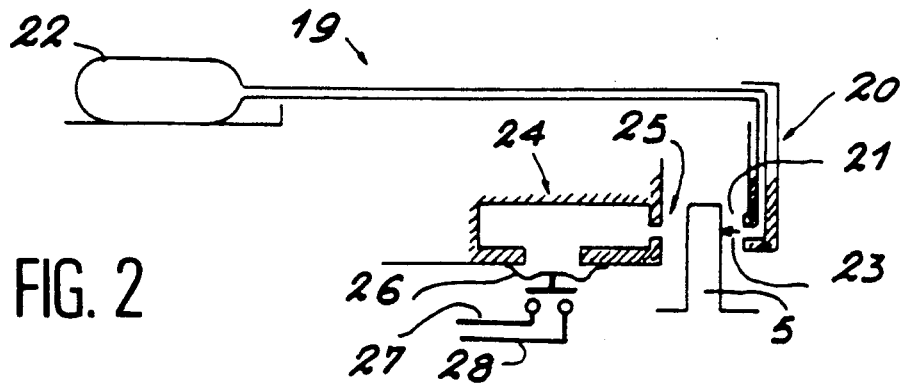
Figure 3:
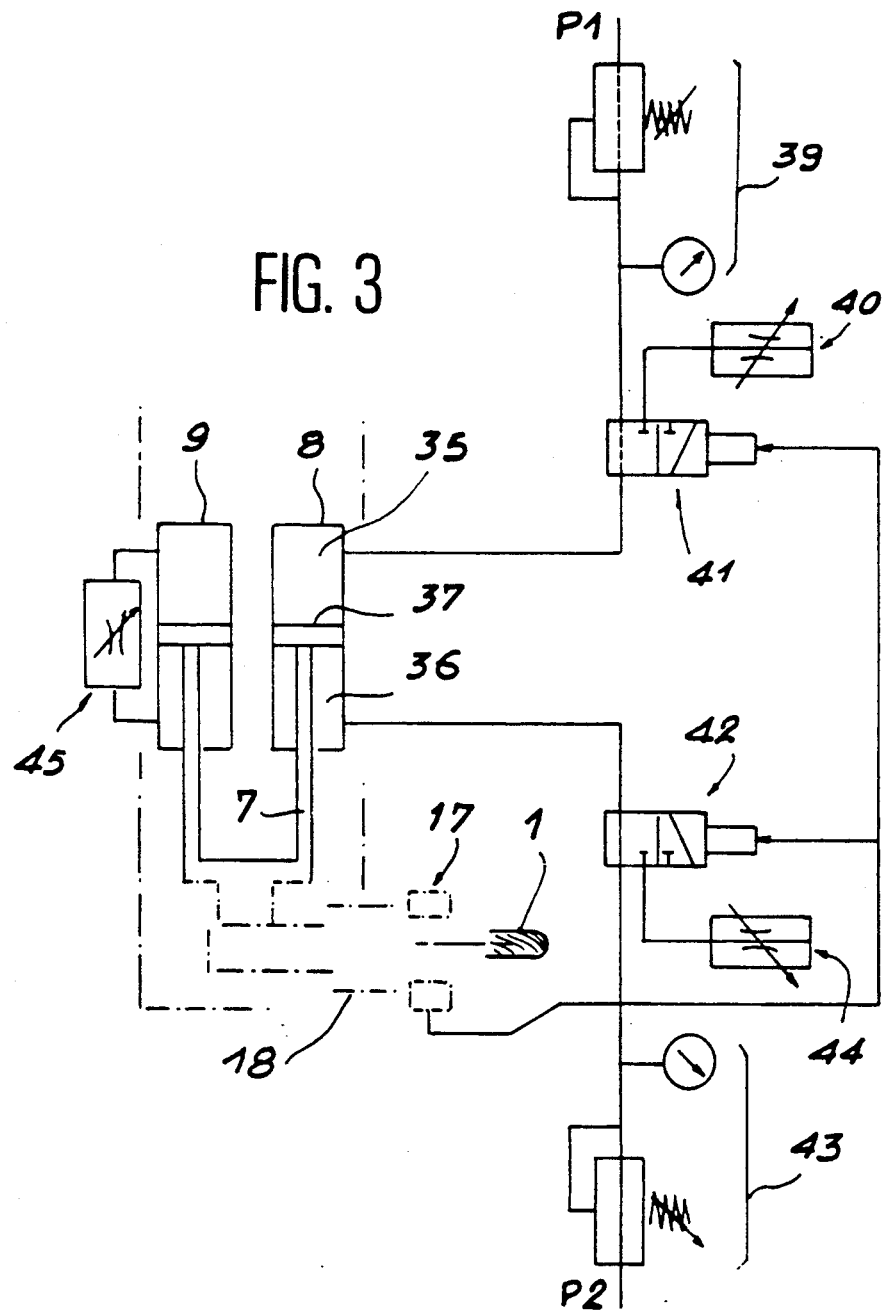

The invention is described in greater detail hereinafter with reference to non-limitative embodiments and the attached drawings, wherein show:

FIG. 1: An embodiment of the invention.
FIG. 2: An optional member of the invention.
FIG. 3: More specifically the controls used.

FIG. 1 shows a milling cutter 1 at the end of a broach or spindle 2 actuated by a pneumatic motor and connected to a robot wrist or handle 3. The latter is moved at a uniform advance speed in such a way that the milling cutter 1 machines a contour 4 whilst removing a burr located on said contour. Reference numeral 5 designates a blocking portion of the burr. The axis of rotation of the milling cutter 1 is roughly perpendicular to the contour 4 and the cutting forces include a tool pressing component F perpendicular to the rotation axis of the cutter 1, which is normal to the contour 4 and oriented, in the case of climb milling, in the direction opposite to the wrist 3.

This pressing force is obtained by means of a pneumatic jack 6, whose rod 7 fixed to the spindle 2 is parallel to the pressing component F and whose cylinder 8 is fixed at one end to the wrist 3. A vertical slide 13 parallel to the pressing force F guides the spindle, whilst allowing its translation with respect to the wrist 3. A shock absorber 9 is also positioned between the spindle 2 and the wrist 3 parallel to the pneumatic jack 8. Finally, an electric contact 10 is fixed to the wrist 3 in the vicinity of the cylinder 8 and comprises at the end of an elastic plate 12, a sensitive element 11 placed in front of or in a longitudinal slot 14 defined by an end 15 and established on the part of slide 13 integral with the spindle 2.

A tachometer 17 is positioned on the spindle 2 facing a disk 18 rotating with the cutter 1. It is optionally possible to provide a pneumatic sensor 19 preceding the cutter 1 along the contour 4 without touching the latter and which comprises, as shown in FIG. 2, two separate parts, whereof one is constituted by a tube 20 terminated by a curved portion 21 and a compressed air source 22, which maintains an air flow 23 in tube 20 and outside the latter in the direction of the other part of the pneumatic sensor 19. Said other part is constituted by a box or case 24 having an orifice 25 in front of the air flow 23 and which comprises within a deformable membrane or diaphragm 26 separating from the orifice 25 a pair of separate electric contacts 27, 28.

Thus, in normal operation, the air flow 23 enters the case 24 and deforms the diaphragm 26, which touches the pair of contacts 27, 28 and thus closes, because it is made from a conductive material, a not shown electric detection circuit. However, as soon as a blocking burr 5 appears, it is interposed along the air flow 23 and the overpressure in the case 24 stops, the diaphragm 26 becomes straight and the electric circuit opens. The great advantage of the pneumatic sensor 19 is that it is very reliable and is in particular insensitive to dust and dirt, which can be swept by the air flow, but which could cover the transmission and reception parts of a sensor incorporating a light beam.

Reference should now be made to FIG. 3. The cylinder 8 contains two chambers 35, 36 separated by a piston 37 connected to the rod 7. The first chamber 35, whose volume increase corresponds to a displacement of the milling cutter 1 towards the contour 4, is connected either to a pressure source P1 via a device having a manual relief valve and manometer 39, or to a calibrated deflation orifice 40. An electrovalve 41 is responsible for the switching process. In the same way, the second chamber 36 is connected by an electrovalve 42 either to a second pressure source P2 via a regulating device having a manual relief valve and manometer 43, or to a deflation orifice 44.

The electrovalves 41, 42 are controlled by the tachometer 17 via data processing means constituted either by the control software of the robot wrist 3, or an autonomous electronic card. The increase in the size of the machined burr leads to a slowing down of the rotation of the cutter 1. When the tachometer establishes that the rotation speed drops below a threshold value, it is considered that a blocking burr 5 exists and the electrovalves 41, 42 are simultaneously switched in such a way that the pressure P2 enters the second chamber 36, whilst the first chamber 35 is connected to the deflation orifice 40. The rod 7 is drawn into the cylinder 8 and the milling cutter 1 is retracted and moved away from the contour 4. As soon as the rotation speed again rises above the threshold value, a reverse switching of the electrovalves 41, 42 connects the first chamber 35 to the pressure source P1, whilst connecting the second chamber 36 to the deflation orifice 44, so that once again a pressing force F can be exerted. The pneumatic sensor 19 is useful for completing the measurements of the tachometer 17 in the case of very large burrs. It is then to be feared that the retraction of the milling cutter 1 will not be sufficiently fast due to the reaction times of the control means. The pneumatic sensor 19 makes it possible to anticipate these burrs and initiate beforehand the removal of the cutter 1.

When the milling cutter 1 passes over the start of a blocking burr 5, it is progressively retracted by a sequence of switching operations. As the oscillatory movement produced can be very fast, use is made of the shock absorber 9 for attenuating it and for making the switching operations less frequent. Thus, the shock absorber 9 constitutes a jack, whose cylinder is connected to the robot 3 and whose rod is connected to the spindle 2 and whose chambers are interconnected by a narrow passage bypass 45, makes it possible to limit chattering. The use of a regulatable shock absorber makes it possible to fix the release speed of the milling cutter, given by the formula $V=F/B$ (F pressing force, B shock absorption coefficient).

The absence of a burr is indicated when the milling cutter 1 rotates at a second threshold speed corresponding to idling machining. This second threshold speed, which is obviously higher than that at which the electrovalves 41, 42 are switched, indicates the points on the contour 4 where deburring has been finished. Other deburring passes are carried out for the rest of the contour 4.

The contact 10 makes it possible to prevent interpretation errors. Thus, at the end of a burr, the shock absorber 9 only permits a progressive return of the cutter 1 towards the contour 4 and it can be instantaneously disengaged from the end of the burr along the contour 4 if the wrist 3 is advanced too rapidly along the contour 4. The milling cutter 1 then idles and the control system could incorrectly deduce from this that there was no burr at this point. Thus, the wrist 3 is moved a constant distance from the contour 4, whilst excepting the burrs, so that as soon as a burr is encountered and the cutter 1 has to be retracted, even by a small amount, the sensitive element 11 passes beyond the end 15 and is introduced into the slot 14, which more reliably indicates to the control system that deburring is not finished at this point. The pneumatic sensor 19 can be used for forecasting the arrival on the blocking burrs 5 and for slowing down the advance of the wrist 3.

Finally, the rotation speed corresponding to the retraction threshold is fixed by the user, but is advantageously chosen as a function of the wear of the cutter 1 and can be approximated by a linear relationship between that corresponding to a new cutter and that corresponding to a cutter to be resharpened.

We claim:
1. Device for contouring blocking burrs comprising:
   a deburring tool;
   means for rotating said deburring tool at a variable rotary speed;
   a support for said tool,
   a pneumatic jack connecting said tool to said support, said jack having a cylinder carried by said support and a rod slideably mounted in said cylinder, said rod carrying a piston at one end and said tool at another end,
   said cylinder enclosing a chamber having a volume, said piston partly defining said volume and sliding in said cylinder to increase or decrease said volume;
   means for moving said support along said burrs so that said tool is pressed onto the burrs when said volume is increased and retracted from said burrs when said volume is decreased;
   a constant pressure gas source and deflation orifice adapted to be connected to said chamber in said cylinder;
   a control circuit operatively associated with said chamber for connecting said chamber either to said gas source or to said deflation orifice; and
   a first sensor connected to said control circuit for measuring a quantity representative of the rotary speed of said tool,
   whereby said control circuit connects said chamber to said gas source when said quantity indicates a rotary speed above a predetermined threshold and connects said chamber to said deflation orifice when said quantity indicates a rotary speed below said threshold.
2. Device for contouring blocking burrs according to claim 1, wherein said device further comprises a shock absorber linked to said tool and said support.
3. Device for contouring blocking burrs according to claim 1, wherein said device further comprises a second sensor indicating when said tool is retracted.
4. Device for contouring blocking burrs according to claim 1, wherein said device further comprises:
   a pneumatic sensor linked to said tool including a nozzle adapted to be positioned on one side of said burr to be contoured for blowing air flow in the direction of said burr,
   a flexible membrane arranged on the other side of said burr from said nozzle and adapted to moved from a rest position to a second position by said air from said nozzle when no burr is present; and
   an electric circuit operatively associated with said flexible membrane, said circuit being opened when said membrane is in its rest position and closed when said flexible membrane is in its second position.

* * * * *